2,816,813

FRACTIONAL DISTILLATION SEPARATION OF PLUTONIUM VALUES FROM LIGHT ELEMENT VALUES

Burris B. Cunningham, Chicago, Ill., assignor to the United States of America as represented by the United States Atomic Energy Commission No Drawing. Application March 13, 1945,
Serial No. 582,590

6 Claims. (Cl. 23—14.5)

This invention relates to a process of removing impurities from plutonium which is a transuranic element having an atomic number of 94. Plutonium is produced by neutron bombardment of uranium. This bombardment results in the capture of neutrons by $U^{238}$ to form $U^{239}$ which ultimately decays to form the plutonium isotope $94^{239}$. Plutonium is separated from the uranium by various methods and eventually is secured as a plutonium compound or elemental plutonium which contains some quantity of impurities.

The present invention is particularly concerned with the removal of light elements having an atomic number of 1 to 26, inclusive, such as oxygen, lithium, beryllium, boron, carbon, sodium, magnesium, fluorine, sulphur, iron, titanium, calcium, potassium, etc.

In accordance with the present invention it has been found that plutonium contaminated with impurities may be purified by converting the plutonium or compound thereof to a halide such as the chloride, bromide, fluoride or iodide, and subsequently purifying the halide. This purification may be effectively performed by a fractional distillation and/or rectification of the halide whereby impurities may be distilled from the plutonium halide and/or the plutonium halide distilled from the impurities.

The exact method used will depend upon the nature of the impurities present. Thus impurities of low volatility may be separated by forming the plutonium hexafluoride, hexabromide or hexachloride, vaporizing this hexahalide from the non-volatilizing impurities. Alternatively the trifluoride or other lower halide may be formed and readily volatile impurities removed therefrom by vaporization. Moreover, a combination of these processes may be used.

A particularly effective method includes the step of forming a lower halide such as the tri- or tetrahalide and distilling the halide under conditions such that no decomposition of the halide occurs. Molecular distillation methods are particularly suitable for this process.

Thus it has been found that if the plutonium in the form of its halides which may include halides such as plutonium tribromide, plutonium trichloride, plutonium tetrabromide, plutonium tetrafluoride or plutonium tetrachloride, is subjected to molecular distillation, light element impurities are readily removed. In carrying out the molecular distillation standard apparatus may be used. This apparatus may comprise an evaporation plate with means for heating it and a condenser surface with means for cooling it. The condenser surface is placed at a distance from the evaporating surface less than the mean free path of molecular travel of the material being distilled at the pressure and temperature used. The entire evaporating system is evacuated until the pressure is about $10^{-4}$ millimeters of mercury. At this pressure, an evaporating surface to condenser surface distance of about ⅛ of an inch has been found satisfactory for efficient distillation of plutonium halides.

Although corrections of the mean free path can be applied for differences in molecular volume, at extremely low pressures this correction is negligible for the purpose of calculating the proper distance between evaporating surface and condenser surface compared to differences in pressure.

Substantial purification from light elements may be secured since the light element halides such as boron trifluoride or silicon chloride are evaporated off before the plutonium halide begins to distill. During this part of the process the condenser is not cooled so that the comparatively volatile compounds, such as boron trifluoride, are withdrawn from the system by the vacuum pump.

During molecular distillation of the plutonium halide below the boiling point of the halide used, certain other impurities are left behind on the evaporating plate and plutonium halide is evaporated and condensed on the condenser surface, during the latter part of the distillation. Thus the distillation is carried out without cooling of the condenser during the first part of the distillation to effect removal of volatile impurities and with cooling of the condenser during the latter part of the distillation in order to effect distillation of the plutonium halide from the less volatile impurities.

In one form of the present invention, it has been found that the plutonium halides may be prepared in situ, in the distillation apparatus. In order to carry this out, plutonium in various forms such as in the form of metal hydride or as an oxide or peroxide, is placed in the distillation apparatus and free halogen, such as fluorine, bromine or chlorine or hydrohalides such as hydrogen fluoride, hydrogen chloride or hydrogen bromide or mixtures of these with hydrogen may be passed in gaseous state through the apparatus and over the plutonium metal or oxide at a temperature of 400–600° C. until the plutonium is converted to the halide without substantial vaporization thereof. The stream of halogen is then shut off and the system evacuated to an extremely low pressure, for example, $10^{-4}$ millimeters of mercury. The plutonium halide is then molecularly distilled at about 400–600° C. onto the condenser surface.

A chloride or oxychloride of plutonium volatilizing at about 500–600° C. is formed by the above procedure. The oxychloride may be formed mixed with chloride if an oxide starting material is used.

If desired, instead of preparing the pluotnium halide in situ, it may be prepared externally by any process, such as by treatment with aqueous solutions of halogen, or hydrogen halide acids or gaseous hydrogen halides such as hydrogen fluoride hydrochloric or hydrobromic acid.

While the purification herein contemplated is particularly well conducted using a molecular distillation process, other convenient distillation, fractional condensation or rectification process may be used to effect a similar separation of impurities.

The purified halide may be reduced to metallic state by means of reducing metals such as calcium or barium or converted to other form or used as such.

Although the present invention has been described with particular reference to the specific details of certain specific embodiments thereof, it is not intended that such details shall be regarded as limitations upon the scope of the invention except insofar as included in the accompanying claims.

What is claimed is:

1. A process of separating plutonium values from values of light elements having atomic numbers of 1–26 by molecular distillation, which comprises treating a mass containing plutonium values and light element values at an elevated temperature with a gaseous halogenating agent whereby the plutonium is converted to a halide, heating the halogenated mass at a temperature below the vaporization temperature of the plutonium halide whereby the light elements having a lower boiling point are vaporized therefrom, then under a pressure less than atmospheric pressure heating said mass at a temperature at which the plutonium halide vaporizes and collecting the plutonium-containing vapor on a cooler surface at a distance from said mass not substantially greater than the mean free path of the plutonium-containing molecule.

2. A process of separating plutonium values from values of light elements having atomic numbers of 1–26 by molecular distillation, which comprises treating a mass containing plutonium values and light element values with a gaseous halogenating agent at a temperature of 400–600° C. whereby the plutonium values are converted to a plutonium halide, then reducing the pressure upon the halogenated mass to approximately $10^{-4}$ mm. of mercury while maintaining said mass at a temperature of 400–600° C. whereby light elements having low boiling points are vaporized from the mass, and then collecting the plutonium-containing vapor formed at said temperature and pressure on a cooler surface at a distance from the mass not substantially greater than the mean free path of the plutonium-containing molecule.

3. The process of claim 2 wherein the halogenating agent is a halogen.

4. The process of claim 2 wherein the halogenating agent is a hydrohalide.

5. The process of claim 2 wherein the halogenating agent is bromine.

6. A process of separating a plutonium halide from halides of light elements having atomic numbers of 1–26 by molecular distillation, which comprises heating a mass containing said halides to about 400° C. under a pressure of $10^{-4}$ mm. of mercury whereby light element halides having low boiling points are vaporized from the mass, then heating the mass between 400–600° C. under said pressure whereby said plutonium halide is vaporized, and collecting plutonium halide vapor on a cooler surface at a distance from the mass not substantially greater than the mean free path of the plutonium halide molecule.

References Cited in the file of this patent

UNITED STATES PATENTS 1,646,734     Marden _____ Oct. 25, 1927

OTHER REFERENCES

"Physical Review," vol. 57, pages 1185–6.